Dec. 27, 1960   R. C. RUEGNITZ   2,966,159
EGG WASHING APPARATUS
Filed April 12, 1955                     2 Sheets-Sheet 1
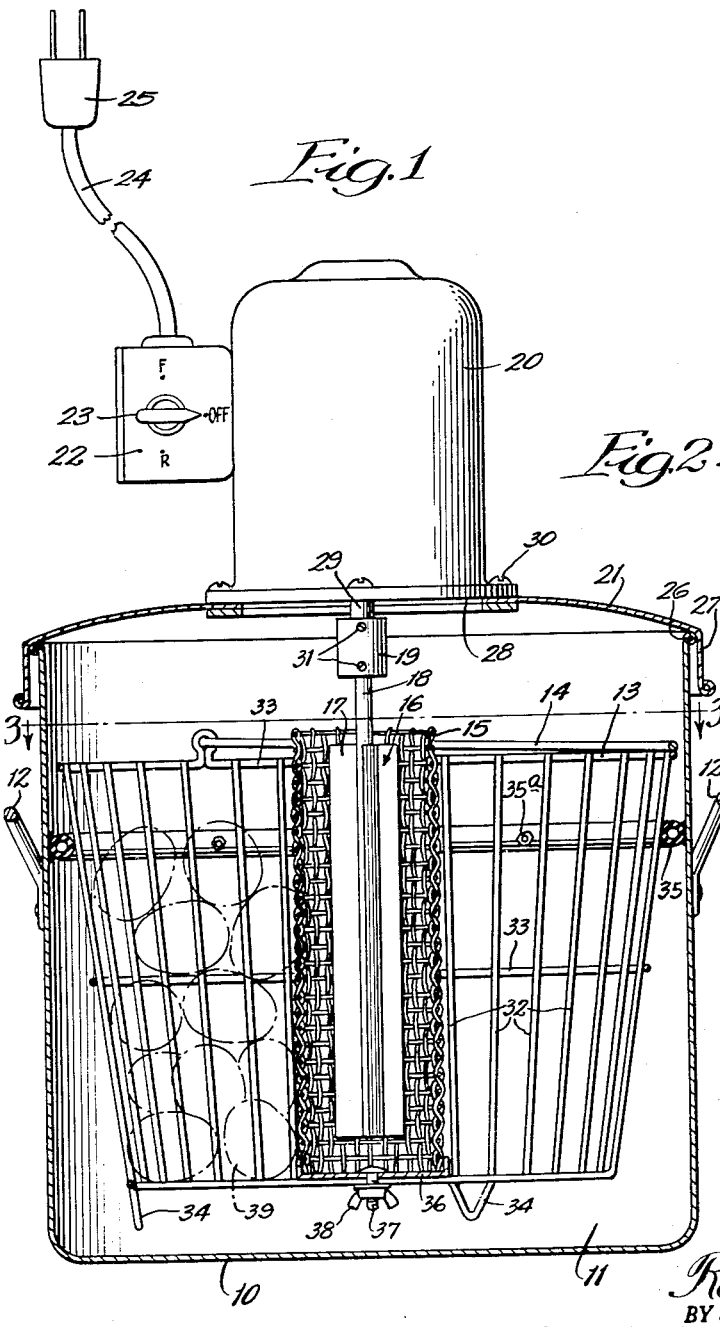
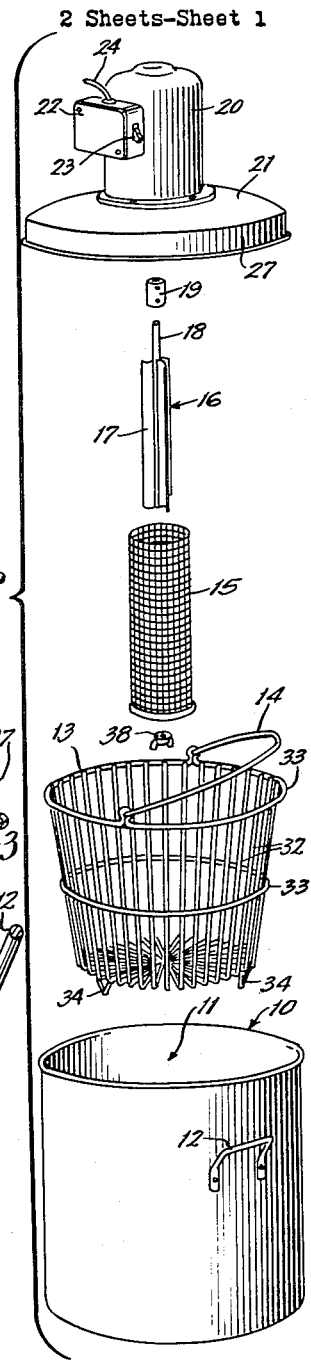
INVENTOR:
Roy C. Ruegnitz,
BY
Dawson, Tilton & Graham,
ATTORNEYS.

Dec. 27, 1960 R. C. RUEGNITZ 2,966,159
EGG WASHING APPARATUS
Filed April 12, 1955 2 Sheets-Sheet 2
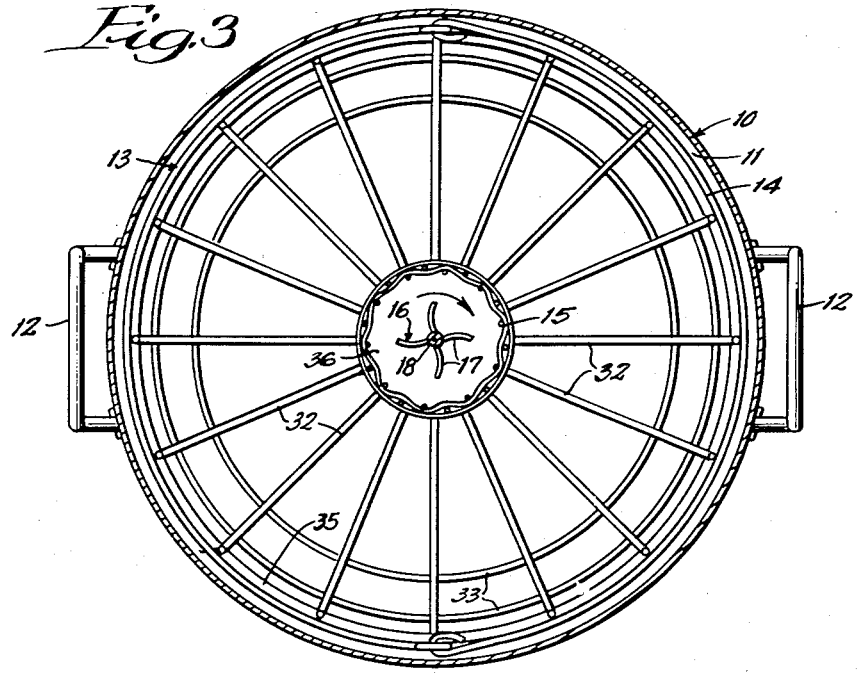
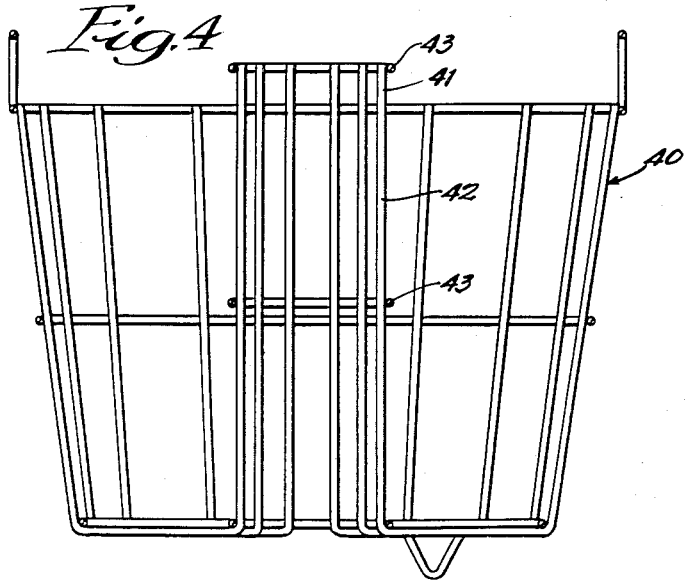
INVENTOR:
Roy C. Ruegnitz,
BY
Dawson, Tilton & Graham,
ATTORNEYS.

United States Patent Office 2,966,159
Patented Dec. 27, 1960

2,966,159

EGG WASHING APPARATUS

Roy C. Ruegnitz, Elkport, Iowa

Filed Apr. 12, 1955, Ser. No. 500,864

4 Claims. (Cl. 134—188)

This invention relates to egg washing apparatus. The apparatus is useful in cleansing a quantity of soiled eggs in preparing the same for packaging in cartons.

Eggs are collected in baskets, and after collection are transported in the baskets to locations wherein they are inspected and packaged in cartons. Frequently, a number of eggs are soiled and must be cleaned before they can be packaged. Most desirably, the collection baskets are adapted to hold the eggs during the washing operations, for in this manner handling of the eggs is minimized and breakage due to handling is substantially reduced.

The texture or character of egg shells varies considerably throughout the year, and particularly in the summer months the egg shells are especially frangible. Also, the character of frangibility of the egg shells varies with the physical condition of the chickens. Therefore, at such times the eggs must be handled very carefully, and washing apparatus, if it is to be successful, must be adapted to accommodate changes in the character of the egg shells.

It is, accordingly, an object of this invention to provide a means and apparatus for cleansing eggs wherein the features indicated above are present. Another object of the invention is to provide apparatus for washing eggs wherein a standard basket used in collecting eggs also serves the function of supporting and containing the eggs during a washing operation. Still another object is in the provision of a basket having an open top and side and bottom walls provided with relatively large openings therethrough, the basket being equipped with a bail that permits it to be easily used in the collection of eggs, while the openings through the bottom and side walls of the basket permit it to be expeditiously used in a washing operation.

A further object of the invention is in the provision of egg washing apparatus in which the eggs are supported within a container and wherein the wash water is agitated so as to thoroughly wash the eggs, the degree of agitation and force of the circulated wash water being selectively controlled so that the single washing apparatus can be employed whether the texture of the egg shell is substantially normal or whether the egg shell is particularly frangible. Still a further object is that of providing in apparatus as described, an agitator comprising a plurality of elongated vanes adapted to be rotated within a shield provided centrally within an open basket that supports the eggs, the vanes having a forward curvature and being adapted to be rotated in reverse directions so that the force of the cleansing liquid circulated thereby is regulated simply through the direction of rotation of the vanes. Yet a further object is to provide an agitator of the character described that is mounted for rotation within a perforate shield extending upwardly through the center of an open basket, the vanes or blades being vertically elongated and extending above the upper limits of the basket, and adapted to circulate liquid in horizontal streams through the basket—the blades always providing a horizontally oriented, circulating layer of water that overcomes the buoyancy of the eggs and tends to hold them in stationary position within the basket. Additional objects and advantages will appear as the specification proceeds.

Embodiments of the invention are illustrated in the accompanying drawings, in which—

Figure 1 is a vertical sectional view taken through the apparatus; Figure 2 is an exploded view showing the parts of the apparatus in spaced apart relation; Figure 3 is a transverse sectional view taken on the line 3—3 of Figure 1; and Figure 4 is a vertical sectional view showing a modified form of basket.

The apparatus, as shown most clearly in Figure 2, comprises a container 10 providing a chamber 11 therein and having handles 12 for carrying the same. Adapted to be supported within the chamber 11 is a basket 13 equipped with a bail 14 to permit the basket to be easily carried and transported. The basket 13 is intended to have secured centrally therein a shield 15 that, as is shown in Figure 1, receives therein an agitator 16 comprising a plurality of blades 17 mounted upon a shaft 18 that is secured by a bushing 19 to the shaft of a motor 20 that is carried by the cover or lid 21. The motor 20 has secured to the casing thereof a junction box 22 having an on-off switch 23 in circuit with the motor, and that is in series with the leads 24 having a male plug 25 at the end thereof adapted to be inserted into an electric outlet.

The container 10 may be formed of any suitable material, such as metal, and is preferably cylindrical, as shown in the drawings. The upper edge of the container may be rolled over to provide a circumferential bead 26 that is adapted to have the cover 21 seated thereon. If desired, the cover 21 may be equipped with a depending flange 27 that extends downwardly along the side walls of the container 10. As is seen in Figure 1, the cover 21 has a central opening 28 therein through which the drive shaft 29 of the motor extends. The casing of the motor 20 should provide a liquid seal about the shaft 29, and the motor casing may be secured to the lid 21 in any suitable manner, as by means of cap screws 30. The motor 20 may be a conventional reversible motor, and it has been found that one operating at a speed of about 1,750 revolutions per minute provides satisfactory results.

As is indicated in Figure 1, the drive shaft 29 of the motor and the shaft 18 of the agitator may each be secured to the bushing or coupling member 19 by means of set screws 31.

The basket 13, in the specific illustration set out, is formed of wire, and the bottom and side walls thereof are defined by a plurality of spaced apart wire elements 32 that are secured together to provide a rigid structure by spaced apart ring members 33. Preferably, the basket 13 is equipped with a plurality of depending legs 34 that permit the basket to be supported upon the ground or other surface, while the bottom wall thereof and the eggs within the basket are maintained at a position above the support surface.

It will be appreciated that the basket 13 must be centered within the container 10 in order that the agitator 16 may be properly aligned axially within the shield 15. Positive positioning of the basket within the container is accomplished by having the side walls of the basket inclined upwardly and outwardly so that the basket is generally frusto-conical in configuration. The inclined side walls cooperate with a basket holder or ring member 35 that is secured to the side walls of the container 10 intermediate the ends thereof and within the chamber 11. The ring 35 is preferably formed of a resilient material and may be a hollow tubular member made of rubber. It may be secured to the container by any of a number of suitable means, such as the nuts and bolts 35a shown in Figure 1. The ring 35 is dimensioned internally with respect to the inclination of the walls of the basket 13 so that the feet 34 of the basket are spaced above the bottom wall of the container when the basket is properly positioned within the container. The resiliency of the ring tends to dampen vibration during operation of the washing apparatus, and thereby minimize egg breakage.

The perforate sleeve or shield 15 may be formed of wire mesh, and may have a bottom wall 36 centrally perforated, as is the bottom wall of the basket 13, so that a bolt 37 can be threaded therethrough. A wing nut 38 is threaded onto the bolt 37 to draw the bottom wall of the shield 15 tightly against the bottom wall of the basket and thereby rigidly secure the sleeve within the basket.

As is well known, eggs are relatively buoyant, and while they will not generally float in water, their position within water is easily disturbed by exerting only minimal forces thereagainst. Since in operation of the device, the agitator 16 is rotating within the sleeve 15, it is necessary to prevent the eggs, designated for identification with the numeral 39 in Figure 1, from entering the sleeve or shield 15 through the open top thereof. This is accomplished by making the sleeve somewhat greater in length than the depth of the basket 13. Also, because of the tendency of eggs to be easily moved within a body of water, it is desired to provide a water circulation pattern within the container 10 that is primarily horizontal as it circulates over the eggs 39. This result is accomplished by having blades or vanes 17 that are vertically elongated and that have a gentle curvature so that the blades are generally concave along the forward surfaces thereof with respect to the clockwise rotation of the agitator, as viewed in Figure 3. Further, the blades, while being slightly shorter than the sleeve or shield 15, extend a substantial distance above the upper edge of the basket 13. Therefore, irrespective of the elevation of the eggs within the basket, the blades or vanes are effective to provide a layer of horizontally circulating liquid that tends to blanket the eggs and hold them in seated position within the basket.

A modified form of basket is illustrated in Figure 4 and is designated generally with the numeral 40. Generally, the basket 40 is substantially similar to the basket 13 heretofore described, and differs therefrom only in that the shield or sleeve 41 is formed integrally with the basket and, therefore, comprises a plurality of wire elements 42 that extend upwardly in spaced apart relation through the center of the basket 40. Rigidity is provided for the elements 42 by rigidly securing ring members 43 thereto at spaced intervals by any suitable means, such as spot welding.

In the form of the apparatus shown in Figures 1 through 3, the basket 13 may be employed in a conventional manner in the collection of eggs. At this time, the removable sleeve may be secured centrally within the basket 13, and eggs as they are collected will be placed within the basket, as is shown in Figure 1. When the basket is filled, it will be carried to a room or other location wherein the eggs are removed from the basket and are placed within cartons. Thus, eggs that are soiled and that must be cleansed prior to packaging are left within the basket. It will be apparent that if desired all of the collected eggs may be washed prior to the packaging thereof.

The basket 13 having soiled eggs therein will be placed within the chamber 11 of the container 10. This is accomplished simply by grasping the bail of the basket and lowering the same into the holder or ring 35. That ring, cooperating with the inclined side walls of the basket, will center the basket so that after the bail or handle is turned downwardly, as shown in Figure 1, and the chamber filled with water and a suitable cleansing agent, the cover 21 is placed on top of the container 10. In this operation the depending annular flange 27 of the cover will tend to shift the lid into proper position so that the agitator 16 is centered within the sleeve 15. The weight of the motor 20 and weight of the lid itself, together with the bead 26 of the container, will form a seal between the container and cover that will prevent loss of liquid from the container during operation of the apparatus. The resiliency of the ring 35 will dampen any movement of the basket 13 caused by vibration.

If the egg shells have good texture and are not especially frangible, the switch 23 is swung to a position wherein the reversible motor 20 rotates the agitator 16 in a clockwise direction, as the agitator is viewed in Figure 3. Since the blades 17 are concave on their forward faces, rotation of the agitator in a clockwise direction drives the liquid outwardly with substantial force, and the liquid surges over the surfaces of the eggs and washes dirt, etc. therefrom. On the other hand, if the egg shells are quite frangible, the switch 23 is moved to the opposite "on" position, which is effective to energize the motor 20 so that it rotates in the reverse or counter-clockwise direction, as viewed in Figure 3. The reverse sides of the blades which are convex sweep the water outwardly therefrom and over the surfaces of the eggs with a gentle motion. Irrespective of the direction of rotation of the agitator, the liquid flows over the egg shells in much the same manner except with greater or lesser force, as the case may be.

The elongated character of the blades moves the body of water outwardly from top to bottom of the basket; and irrespective of the elevation of the eggs within the basket, a layer or blanket of water moving in horizontal directions tends to keep the eggs in seated position so that they are not bounced about and the shells thereof broken. The basket is spaced above the bottom of the container and tapers inwardly toward its bottom so that a considerable space is provided between the basket and the container adjacent the bottom of the basket. Heavy particulate matter flushed from the surfaces of the eggs may fall freely to the bottom of the container through these large passageways, which also permit free circulation of liquid therethrough.

While in the foregoing specification, embodiments of the invention have been set forth in considerable detail for purposes of illustration, it will be apparent to those skilled in the art that numerous changes may be made in those details without departing from the spirit and principles of the invention.

I claim:

1. In a structure of the character described, a container having an imperforate detachable cover and providing a chamber therein adapted to receive a liquid, a perforate basket for supporting eggs within said container and having a sleeve extending centrally therein and above a horizontal plane defined by the upper rim of said basket, said basket being removably suspended within said chamber, an agitator comprising a vertical shaft equipped with a plurality of elongated vertical blades adapted to be received within said sleeve, said blades extending generally above a horizontal plane defined by the upper rim of said basket when said basket is suspended within said chamber, each of said blades being horizontally curved to define a horizontal concavity along the forward surface thereof, and motor means arranged with said agitator for rotating the same, said motor means being selectively operable for rotating said agitator in opposite directions to vary the degree of liquid agitation produced by said agitator within said chamber.

2. The structure of claim 1 in which said sleeve is detachably mounted within said basket.

3. The structure of claim 1 in which said sleeve is formed integrally with said basket.

4. In an egg washing apparatus, a wire basket having perforate side and bottom walls and equipped centrally with a vertically extending perforate shield, a container providing a chamber therein adapted to contain a liquid, means for removably supporting said basket within said chamber, a cover for said container, an agitator adapted to be received within said shield comprising an elongated vertical shaft and a plurality of vertical agitator blades extending longitudinally and radially with reference to said shaft and being secured thereto, said blades extending to at least a horizontal plane passing through the upper rim of said basket when said agitator is received within said shield, reversible motor means for selectively rotating said shaft in opposite directions, said agitator blades each being radially curved and being horizontally concave along the forward surface thereof.

References Cited in the file of this patent

UNITED STATES PATENTS

| | | |
|---|---|---|
| 636,400 | Friedman | Nov. 7, 1899 |
| 1,518,484 | Cooley | Dec. 9, 1924 |
| 1,551,884 | James | Sept. 1, 1925 |
| 1,927,943 | Long | Sept. 26, 1933 |
| 1,953,409 | Hovda | Apr. 3, 1934 |
| 2,509,889 | Paden | Aug. 29, 1950 |
| 2,582,801 | Steen | Jan. 15, 1952 |
| 2,591,578 | McNealy | Apr. 1, 1952 |
| 2,666,440 | Collins | Jan. 19, 1954 |